Oct. 8, 1940.  W. J. LLOYD  2,216,822
RATCHET RELEASING MEANS
Filed April 1, 1939
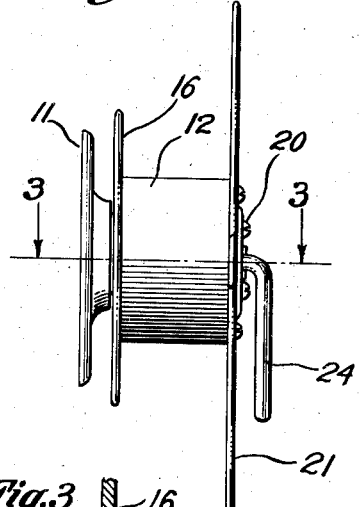
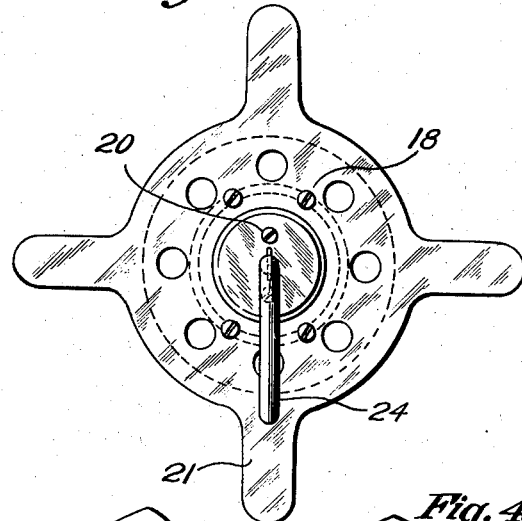
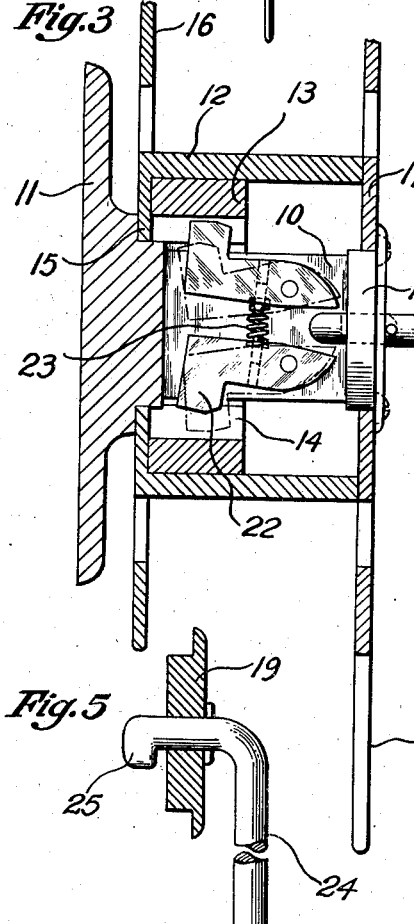
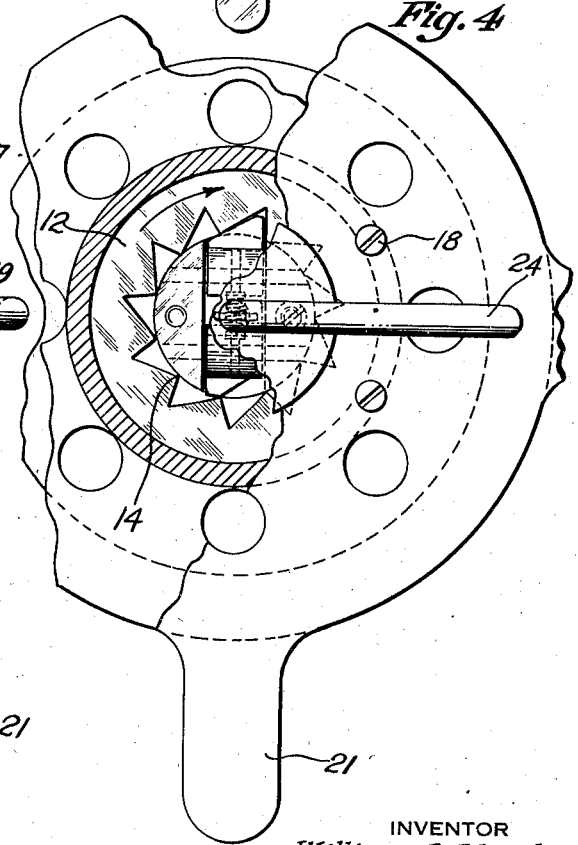
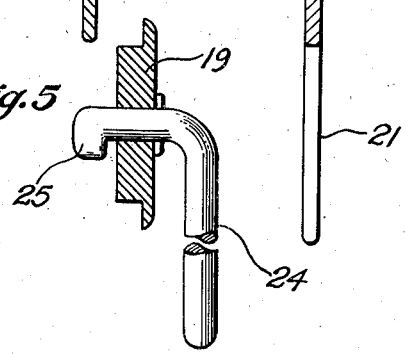
INVENTOR
William J. Lloyd
BY
Joseph N. Schofield
ATTORNEY Patented Oct. 8, 1940

2,216,822

UNITED STATES PATENT OFFICE 2,216,822

RATCHET RELEASING MEANS

William J. Lloyd, Hartford, Conn.

Application April 1, 1939, Serial No. 265,493

4 Claims. (Cl. 188—81)

This invention relates to ratchet mechanisms and particularly to means to alternately release a member from engagement with either one of a pair of ratchets or pawls so that the member may be allowed slowly and step by step to rotate in one direction, the member being rotatable freely in the opposite direction.

An object of the present invention is to provide a mounting for a pair of oppositely disposed ratchets or pawls each of which is adapted to engage the teeth of a single ratchet wheel, the ratchets or pawls being individually controlled so that each may be released and the opposite pawl may take up on another tooth of the ratchet wheel after the member has been rotated a slight amount.

Another object of the invention is to provide a manually operable lever disposed between the ends of the pawls so that movements of the lever will move one pawl to an inoperative position, and movement of the lever in the opposite direction will move the other pawl to an inoperative position.

And finally it is an object of the invention to provide a compact self-contained unit adapted to be fixed in position and enabling a member to be manually rotated freely in one direction in which the pawls move alternately to inoperative positions against a light spring, but in the opposite direction the pawls take up against the teeth of the ratchet wheel and require to be individually and manually released one after the other.

One feature of the invention that is important is that a reel may be freely rotated in a direction to wind up a line but can be rotated in a direction to let off the line only a small amount at a time and then only by successively operating a releasing lever.

With the above and other objects in view, my invention consists in the features of construction and operation set forth in the following specification and illustrated in the accompanying drawing.

In the accompanying drawing annexed hereto and forming a part of this specification, I have shown the invention embodied in and adapted for a line tightening device but it will be understood that the invention can be otherwise embodied and that the drawing is not to be construed as defining or limiting the scope of the invention, the claims appended to this specification being relied upon for that purpose.

In the drawing:

Fig. 1 is a side elevation of a complete unit in which the present invention is incorporated;

Fig. 2 is an end elevation taken from the right hand side of Fig. 1;

Fig. 3 is a central sectional view showing the pawls respectively in their operative and in their inoperative positions;

Fig. 4 is a partial outside view and sectional view showing the pawls in position, one being engaged with a tooth of the ratchet wheel and other pawl ready to engage another tooth when the ratchet wheel has been moved slightly in a counterclockwise direction; and Fig. 5 is a detail side elevation of an operating lever.

In the above mentioned drawing there has been shown but one embodiment of the invention which is now deemed preferable, but it is to be understood that changes and modifications may be made within the scope of the appended claims without departing from the spirit of the invention.

Referring more in particular to the figures of the drawing there is shown at 10 a body member which may be supported in fixed position by any suitable means. For that purpose a flange 11 is formed integrally with the body member 10 and by means of screws or other fastening means the flange 11 may be mounted in a fixed position.

Supported for rotation around the body member 10 is a reel or other cylindrical member 12 within which is secured in any appropriate manner an internal ratchet wheel 13 having an odd number of teeth 14 cut therein. As shown most clearly in Fig. 3 the rotatable member 12 has an inwardly extending flange 15 at one end bearing upon the body member 10. Also formed integrally with the rotatable member 12 at this end is an outwardly extending flange 16.

At the opposite end of the rotatable member 12 a disk 17 is fastened as by screws 18. This disk 17 has a central hole the surface of which bears against a member 19 secured at the outer end of the body member 10 as by screws 20. A flange outwardly extending from the member 19 retains the rotatable member 12 in position upon the body member 10. Outwardly extending from the disk 17 are arms 21 by means of which the member 12 may be manually rotated.

Pivotally mounted within the body member 10 are ratchet pawls 22. Two of these pawls are provided oppositely disposed to each other and pivoted intermediate their length as clearly shown in Fig. 3. Between the pawls may be mounted a light coiled spring 23 pressing the pawls 22 to their outer engaged position but permitting each pawl to ratchet over the teeth 14 when member 12 is rotated in the direction indicated by the arrow in Fig. 4. Rotation of the member 12 in the opposite direction however will cause one or the other of the pawls 22 to take up against the substantially radial side of one of the teeth 14. The opposite pawl will be in a substantially inoperative position but ready to move outwardly to an engaged position against an adjacent tooth 14 when the first pawl is forced inwardly and the rotatable member rotated far enough to let the pawl move outward. As there are an odd number of teeth 14 in the ratchet wheel 13 but one pawl 22 can be engaged, the opposite pawl being held in retracted position. Also slight rotative movement of the member 12 in the direction opposite to that indicated by the arrow shown in Fig. 4 when an engaged pawl 22 is moved inwardly will permit the opposite pawl to move outwardly and engage another tooth 14.

In order to individually move the pawls 22 to their inner or inoperative position a hand lever 24 is pivotally mounted within the member 19. The inner end of the lever 24 is bent as shown in Fig. 5 and forms a short lever 25 disposed centrally between the operating ends of the pawls 22. By oscillating the lever 24 in one direction one of the pawls 22 may be retracted and by oscillating the lever in the opposite direction the opposite pawl will be retracted.

One use to which the device may be put is for winding and unwinding a line wrapped about the reel formed by the rotatable member 12 between the flange 16 and disk 17. In the direction of rotation to wind the line upon the reel 12 the pawls 22 may freely ratchet over the teeth 14. The line will therefore be held in position by one or the other of the pawls 22. In the opposite direction of rotation in which the line is being unwound it is necessary to move the hand lever 24 alternately to the left and right. This will permit the rotatable member 12 to rotate slightly step by step as each pawl is released and the other pawl takes up upon another tooth.

I claim as my invention:

1. A ratchet mechanism comprising in combination, a body member, a rotatable member having ratchet teeth thereon, surrounding said body member, opposed ratchet pawls housed within said members and adapted to engage said teeth and lock said rotatable member, and means to alternately disengage said ratchets from engagement with said teeth.

2. A ratchet mechanism comprising in combination, a body member, a rotatable member having ratchet teeth thereon surrounding said body member, opposed ratchet pawls housed within said members and normally forced toward engaged positions with said teeth, and a lever operable to alternately disengage said ratchets from engagement with said teeth.

3. A ratchet mechanism comprising in combination, a body member, a rotatable member having ratchet teeth thereon surrounding said body member, opposed ratchet pawls housed within said members and adapted to engage said teeth, and an operating member having its inner end extending between said pawls whereby oscillation thereof in either direction will move one or the other of said pawls to an inoperative position.

4. A ratchet mechanism comprising in combination, a body member, a rotatable member having internal ratchet teeth thereon surrounding said body member, opposed ratchet pawls pivotally mounted within said body member and adapted to engage said teeth, and a lever the outer portion of which may be manually operated and the internal portion of which forms a short operating lever for said pawls disposed between said pawls.

WILLIAM J. LLOYD.